United States Patent [19]

Bott

[11] 4,133,465

[45] Jan. 9, 1979

[54] ADJUSTABLE VEHICLE ARTICLE CARRIER

[76] Inventor: John A. Bott, 931 Lakeshore Dr., Grosse Point Shores, Mich. 48236

[21] Appl. No.: 798,579

[22] Filed: May 19, 1977

[51] Int. Cl.$^2$ ............................................... B60R 9/00
[52] U.S. Cl. .................. 224/42.1 D; 296/3; 403/260
[58] Field of Search .............. 224/42.1 D, 42.1 F, 224/42.1 G, 42.1 E, 42.1 R, 29 R; 105/369; 296/91, 3, 37.7; 403/260, 261, 262

[56] References Cited

U.S. PATENT DOCUMENTS

| Re. 26,538 | 3/1969 | Bott | 224/42.1 D |
|---|---|---|---|
| Re. 26,539 | 3/1969 | Bott | 224/42.1 D |
| 3,519,292 | 7/1970 | Krikorian | 403/260 |
| 3,918,322 | 11/1975 | Frier et al. | 403/260 |

Primary Examiner—Trygve M. Blix
Assistant Examiner—Kenneth Noland
Attorney, Agent, or Firm—Harness, Dickey & Pierce

[57] ABSTRACT

An article carrier adapted for attachment to a portion of a motor vehicle having a pair of spaced supporting rails with adjustable article restraining bars extending therebetween. Slider members are provided having a clamp member operatively associated therewith for movably securing the restraining bar to the supporting rails and include a device for retaining the clamp in an operatively associated position relative thereto. Additionally, stanchions are provided for securing the supporting rails in a spaced relationship to the motor vehicle which are also adapted to allow the slider members to be moved into registration therewith so as to maximize the area enclosed by the article restraining bars and support rails.

7 Claims, 5 Drawing Figures

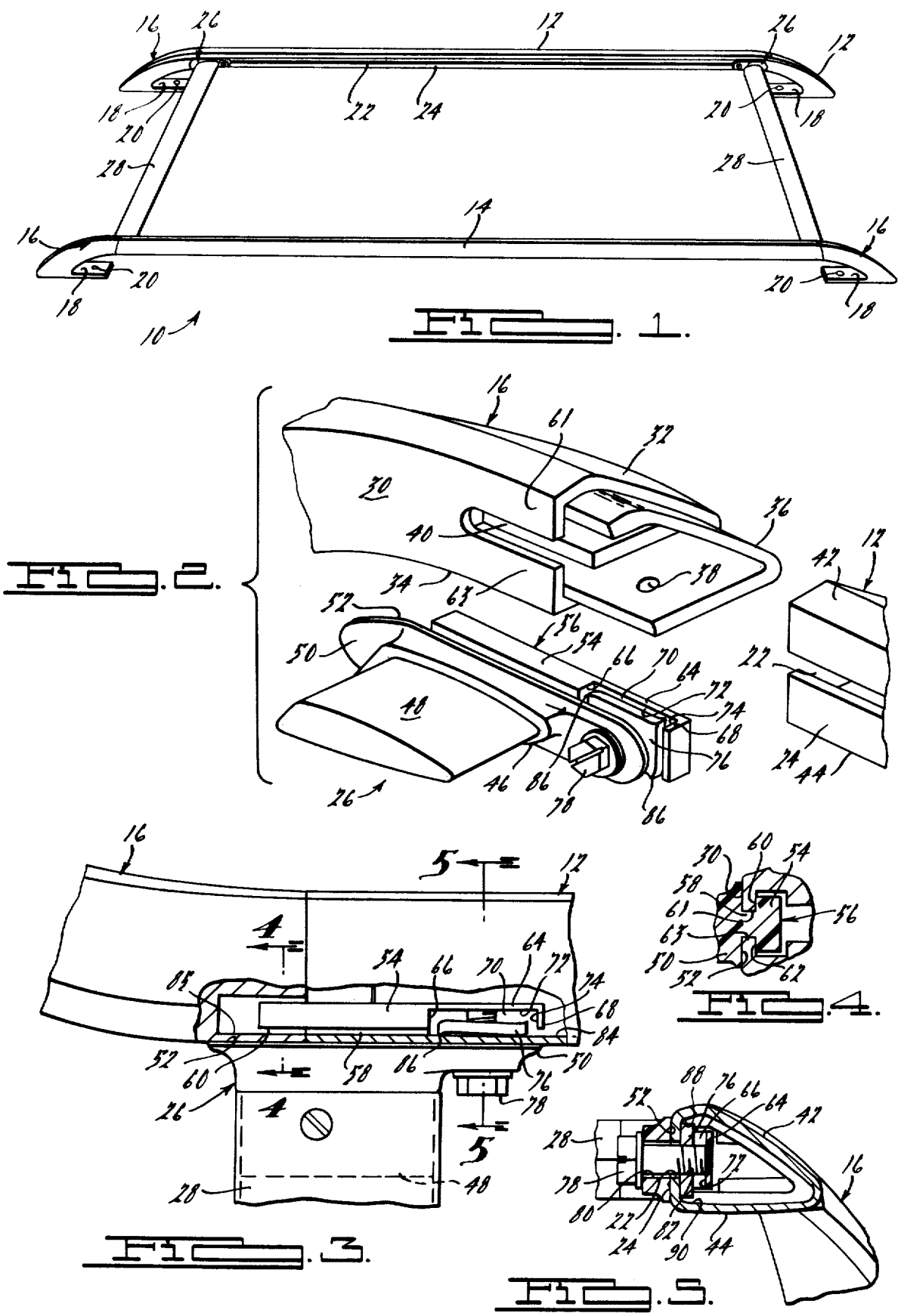

ADJUSTABLE VEHICLE ARTICLE CARRIER

BACKGROUND AND SUMMARY OF THE INVENTION

The present invention relates generally to article carriers for motor vehicles and more particularly to such article carriers which include adjustable article restraining bars thereon.

Article carriers or luggage racks are becoming increasingly popular as a useful and decorative accessory for a motor vehicle. Such carriers commonly include supporting rails secured to a portion of a motor vehicle and having article restraining bars extending therebetween. In some such carriers these restraining bars may be provided with means adjustably interconnecting them with the supporting rail members so as to enable varying size articles to be easily restrained therebetween by merely adjusting the spacing therebetween. In such cases the article restraining bar will have a slidable member interfitted within opposite ends thereof and partially disposed within the support rails in sliding engagement therewith and may include fastening means which cooperate with an associated clamp member to secure the restraining bar in position. In some cases these clamp members may be disposed within the supporting rails with the fastening means retaining them in proper operative position. However, should an individual inadvertently overloosen the fastener means, the clamp member may fall out of proper position within the support rail thus necessitating removal and disassembly of the entire carrier in order to recover it.

Accordingly, the present invention provides an improved article carrier of the type having adjustable article restraining bars which include means for retaining associated clamp members in operative position even in the event fastening means are inadvertently removed therefrom. Thus, the present invention allows a user thereof to reinstall the fastener means in operative relationship with the clamp member without the need to completely remove and/or disassemble the carrier. Also, the present invention provides lateral support rails and associated stanchions for securing the carrier to a motor vehicle which are particularly designed to provide a greater enclosed area for any given size carrier than is provided by conventional racks of a comparable size.

Additional features and advantages of the present invention will become apparent from the following description of the preferred embodiment taken in conjunction with the appended drawings.

BRIEF DESCRIPTION OF THE DRAWINGS

FIG. 1 is a perspective view of an article carrier in accordance with the present invention;

FIG. 2 is an exploded enlarged perspective view of a portion of the article carrier of FIG. 1 illustrating a portion of a support rail, associated stanchion, and slider assembly;

FIG. 3 is an enlarged plan view of a portion of an assembled stanchion and support rail in accordance with the present invention having portions broken away to illustrate a slider bar assembly in operative relationship thereto;

FIG. 4 is a sectional view of a portion of the slider bar assembly and associated stanchion, the section being taken along line 4—4 of FIG. 3; and FIG. 5 is a sectional view of the support rail, associated stanchion and slider member, the section being taken along line 5—5 of FIG. 3.

DESCRIPTION OF THE PREFERRED EMBODIMENT

Referring now to FIG. 1, there is shown an article carrier in accordance with the present invention indicated generally at 10 suitable for attachment to a portion of a motor vehicle. The article carrier includes a pair of spaced longitudinally extending support rail members 12 and 14 each of which has a pair of stanchions 16 interfitted with opposite end portions thereof. Stanchions 16 are each provided with a lower flange portion 18 having an opening 20 therethrough for securing stanchion 16 to a portion of a motor vehicle so as to support support rails 12 and 14 in a spaced relationship thereto. Each of the support rails is substantially identical and includes a coextensive elongated slot 22 provided in an inwardly facing sidewall portion 24 thereof in which is disposed a pair of slider bar assemblies 26. Each of the slider bar assemblies has an article restraining bar 28 attached thereto which article restraining bars extend between longitudinally extending support rails 12 and 14 and are movable therealong so as to constrain an article therebetween. As support rails 12 and 14, as well as each of the stanchions 16 and slider bar assemblies 26, are substantially identical in construction and operation only one such slider member and associated stanchion and support rail will be described in detail below.

As best seen with reference to FIG. 2, stanchion 16 is generally shaped as shown having a generally triangular cross-sectional shape including an inwardly facing sidewall portion 30 and generally converging upper and lower sidewall portions 32 and 34 respectively. A comparably cross-sectionally shaped member 36 extends outwardly from one end of stanchion 16 and is adapted to be telescopically received within an open end portion of support rail 12 so as to allow stanchion 16 to be secured thereto. Member 36 is provided with an opening 38 in the lower surface thereof which is adapted to receive a fastener so as to retain end portions of stanchion 16 and support rail 12 in mutual engagement. As seen therein, stanchion 16 is provided with a longitudinally extending slot 40 in the inwardly facing sidewall portion 30 thereof which is positioned so as to align with the longitudinally extending slot 22 provided in the inwardly facing surface 24 of the support rail 12. Support rail 12 has a similar cross-sectional shape as that of the stanchion member including previously mentioned inwardly facing sidewall surface 24 in which is disposed elongated slot 22 and also including outwardly converging upper and lower wall portions 42 and 44 respectively.

Slider bar assembly 26 comprises a slider member 46 having an outwardly extending generally wing shaped projection 48 which is adapted to be telescopically received within an end portion of an article restraining bar 28. A flange portion 50 surrounds projection 48 and has a relatively flat surface 52 adapted to engage the inwardly facing sidewall 24 or 30 of the support rail 12 and/or stanchion 16. A generally "T" shaped elongated guide portion 56 extends outwardly from surface 52 of flange portion 50 being connected thereto by an elongated interconnecting portion 58. End 54 of guide portion 56 has a width greater than that of interconnecting portion 58 so as to provide a pair of longitudinally elongated shoulders 60 and 62 on opposite sides of interconnecting portion 58.

As best seen with reference to FIG. 4, interconnecting portion 58 has a transverse width slightly less than the width of slots 40 and is of a depth slightly greater than the thickness of sidewall 30 so as to space shoulders 60 and 62 from surface 52 a sufficient distance to accommodate upper and lower flange portions 61 and 63 respectively of inwardly facing sidewall 30 of stanchion 16 as well as corresponding portions of support rail 12. Guide portion 56 also includes an extension portion 65 extending longitudinally from surface 66 and adapted to be disposed interiorly of the support rail 12. An abutment 68 is provided at the extreme end of extension portion 64 which, in combination with surface 66 and extension portion 64, forms a three-sided recess 70 defined by surfaces 66, 72, and 74. A clamp member 76 is disposed within recess 70 and fastening means 78 in the form of a threaded screw is provided which extends through an opening 80 provided in flange portion 50 and threadedly engages an aperture 82 provided in the clamp member 76.

As best seen with reference to FIGS. 3 and 5, slider member 26 enables article restraining bar 28 to be moved in a longitudinal direction with respect to support rails 12 and 14 and positioned so as to restrain an article in position upon the article carrier. Once a position has been selected for article restraining bars 12 and 14, an individual need merely tighten fastening means 78 thereby drawing clamp member 76 into engagement with inner surfaces 84 or 85 of inwardly facing sidewall portions 24 or 30 of the support rail 12 or stanchion 16 respectively. Clamp member 76 is provided with pointed teeth 86 at opposite corners thereof which bitingly engage interior surface 84 of supporting rail 12 thereby preventing longitudinal movement of article restraining bar 28. Also, it should be noted that abutment 68 and extension 64 provided on guide portion 56 of the slider member 46 serve to retain clamp member 76 in position should fastening means 78 be inadvertently removed during an adjustment of article restraining bar 28. More specifically, abutment 68 in combination with the rear surface portion 66 of the guide portion 56 mutually cooperate to prevent longitudinal movement of clamp member 76 whereas the interior surfaces 88 and 90 of upper and lower wall portions 42 and 44 and surface 72 of extension portion 64 mutually cooperate to prevent lateral movement of clamp member 76 thereby retaining the clamp member in an approximate position so as to enable an individual who has inadvertently removed fastening means 78 to easily reinstall it without disassembly of the entire article carrier. It should also be noted that the longitudinal slots 40 provided in each of the stanchions 16 of the present invention are similar to slots 22 provided on the support rails 12 and 14 and are positioned so as to be in alignment therewith. Slots 40 allow respective slider members 26 to be moved into registration therewith thus enabling article restraining bars 28 to be moved further apart for a given size article carrier thereby allowing the article carrier of the present invention to more easily accommodate larger articles within the enclosed perimeter defined by the article restraining bars 28 and support rails 12 and 14.

While it is apparent that the preferred embodiment of the invention disclosed is well calculated to provide the advantages above stated, it will be appreciated that the invention is susceptible to modification, variation, and change without departing from the proper scope or fair meaning of the subjoined claims.

I claim:

1. In an article carrier for a motor vehicle, an article restraining bar slider assembly comprising:

a slider member;

clamp member associated with said slider member for clamping said slider member in position along a support rail;

fastening means engaging said slider member and said clamp member for moving said clamp member into clamping relationship with said support rail; and restraining means provided on said slider member for retaining said clamp member upon removal of said fastening means so as to thereby allow said fastening means to be reinstalled with respect to said clamp member without disassembling said slider bar assembly, said support rail comprising an elongated member having a longitudinally extending slot provided in a sidewall thereof, said slider member having a guide portion extending through said opening and including oppositely projecting elongated shoulder portions slidingly engaging an interior surface of said sidewall, said retaining means comprising longitudinally spaced abutment means located on the longitudinally opposite sides of said clamp member for limiting relative longitudinal movement of said clamp member with respect to said slider member when said fastening means is disengaged from said clamp member.

2. A slider assembly as set forth in claim 1 wherein said clamp member is disposed interiorly of said elongated member and said slider member further includes a flange portion engaging an exterior surface of said sidewall, said fastening means being operative to bring said flange portion and said clamp member into clamping engagement with said sidewall.

3. A slider assembly as set forth in claim 1 wherein said abutment means comprises a substantially perpendicularly disposed projection provided on one end of a longitudinal extension portion of said guide portion.

4. A slider assembly as set forth in claim 3 wherein said extension portion cooperates with said interior surface of said sidewall to restrain transverse movement of said clamp member.

5. An article carrier as set forth in claim 1 further comprising a second article restraining bar extending between said support rails adjacent one end and said slots provided in said stanchions being operative to allow said slider members interfitted with opposite ends of said one article restraining bar to be moved into registration therewith thereby maximizing the area enclosed by said support rails and said one and said second article restraining bars.

6. An article carrier for a motor vehicle comprising:

a pair of elongated support rails, each of said rails having a longitudinally coextensive slot provided in a sidewall thereof;

stanchions interfitted with opposite ends of each of said support rails for securing said support rails in a spaced relationship to a portion of a motor vehicle, each of said stanchions having a slot provided in a sidewall thereof in an aligned relationship with and forming a continuation of said support rail slot;

at least one slider member disposed on each of said support rails each having a guide portion extending through said slot;

a clamp member associated with each of said slider members;

fastening means extending between each of said slider members and said clamp members restraining said members in assembled relationship; and restraining means provided on said slider member for retaining said clamp member upon removal of said fastening means;

at least one article restraining bar having opposite ends interfitted with portions of said slider members, said slider members allowing said article restraining bar to be moved along said support rails and said fastening means and clamp members cooperating to retain said article restraining bar in position along said support rails, said retaining means comprising longitudinally spaced abutment means located on the longitudinally opposite sides of said clamp member for limiting relative longitudinal movement of said clamp member with respect to said slider member when said fastening means is disengaged from said clamp member.

7. A slider assembly as set forth in claim 6 wherein said abutment means comprises a substantially perpendicularly disposed projection provided on one end of a longitudinal extension portion of said guide portion.

* * * * *